(12) United States Patent
Smith et al.

(10) Patent No.: US 11,866,200 B2
(45) Date of Patent: Jan. 9, 2024

(54) PULSED LINE FABRICATION FOR A FUSELAGE USING WORK STATIONS

(71) Applicant: The Boeing Company, Chicago, IL (US)

(72) Inventors: Daniel R. Smith, Woodinville, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 17/454,285

(22) Filed: Nov. 10, 2021

(65) Prior Publication Data
US 2022/0153442 A1 May 19, 2022

Related U.S. Application Data

(60) Provisional application No. 63/115,044, filed on Nov. 18, 2020.

(51) Int. Cl.
*B64F 5/10* (2017.01)
*B64F 5/50* (2017.01)
(Continued)

(52) U.S. Cl.
CPC ............... *B64F 5/10* (2017.01); *B64C 1/068* (2013.01); *B64C 1/12* (2013.01); *B64F 5/50* (2017.01);
(Continued)

(58) Field of Classification Search
CPC ... B64F 5/10; B64F 5/50; B64C 1/068; B64C 1/12; G06K 7/0008; B33Y 30/00; B33Y 40/00; B33Y 80/00
See application file for complete search history.

(56) References Cited

U.S. PATENT DOCUMENTS 8,752,791 B2 * 6/2014 Griess .................... B29C 70/30
244/119
9,834,323 B2 * 12/2017 Georgeson .......... H04W 40/244
(Continued)

FOREIGN PATENT DOCUMENTS

EP 1215119 A1 6/2002
EP 2221151 A2 8/2010
(Continued)

OTHER PUBLICATIONS

European Patent Office Extended Search Report, dated Apr. 19, 2022, regarding Application No. EP21207545.1, 8 pages.
(Continued)

*Primary Examiner* — Lawrence Averick
(74) *Attorney, Agent, or Firm* — Yee & Associates, P.C.

(57) ABSTRACT

Systems and methods are provided for fabricating a fuselage of an aircraft. The method includes: disposing arcuate sections of fuselage at a track of a factory such that concavities of the arcuate sections of the fuselage face a floor of the factory, and bearing edges of the arcuate sections of fuselage directly contact the track; advancing the arcuate sections of fuselage synchronously along the track in a process direction; and performing work within concavities of the arcuate sections of fuselage during pauses between pulses of the arcuate section of fuselage via stations that are disposed beneath the concavities and that are directly mounted to the floor of the factory.

30 Claims, 9 Drawing Sheets

(51) Int. Cl.
*B64C 1/06* (2006.01)
*B64C 1/12* (2006.01)
*G06K 7/00* (2006.01)
*B33Y 30/00* (2015.01)
*B33Y 80/00* (2015.01)
*B33Y 40/00* (2020.01)

(52) U.S. Cl.
CPC ............ *G06K 7/0008* (2013.01); *B33Y 30/00* (2014.12); *B33Y 40/00* (2014.12); *B33Y 80/00* (2014.12)

(56) References Cited

U.S. PATENT DOCUMENTS

| | | | | |
|---|---|---|---|---|
| 10,239,641 | B2* | 3/2019 | Georgeson | B64F 5/60 |
| 10,254,499 | B1* | 4/2019 | Cohen | B33Y 70/10 |
| 10,967,518 | B2* | 4/2021 | Neuhaus | G05B 19/41805 |
| 11,044,011 | B2* | 6/2021 | Georgeson | H04W 40/244 |
| 11,117,184 | B2* | 9/2021 | Hirai | B21J 15/42 |
| 2012/0119028 | A1* | 5/2012 | Griess | B64F 5/10 244/119 |
| 2015/0329221 | A1* | 11/2015 | Georgeson | G01N 29/0654 702/36 |
| 2018/0065762 | A1* | 3/2018 | Georgeson | H04W 40/244 |
| 2019/0030588 | A1* | 1/2019 | Hirai | B64F 5/10 |
| 2019/0173574 | A1* | 6/2019 | Georgeson | B64F 5/60 |
| 2019/0217475 | A1* | 7/2019 | Neuhaus | B25J 9/1694 |

FOREIGN PATENT DOCUMENTS

| | | |
|---|---|---|
| EP | 2952890 A2 | 4/2015 |
| EP | 3135442 A1 | 3/2017 |
| EP | 3378789 A1 | 9/2018 |
| EP | 3511252 A1 | 7/2019 |
| EP | 3718699 A1 | 10/2020 |

OTHER PUBLICATIONS

Netherlands Patent Office Written Opinion and Search Report with English Translation, dated Jul. 23, 2021, regarding Application No. NL2027431, 15 pages.

* cited by examiner

PULSED LINE FABRICATION FOR A FUSELAGE USING WORK STATIONS

CROSS-REFERENCE TO RELATED APPLICATION

This application claims the benefit of U.S. Provisional Patent Application Ser. No. 63/115,044, filed Nov. 18, 2020, and entitled "Pulsed Line Fabrication for a Fuselage Using Work Stations;" which is incorporated herein by reference in its entirety.

FIELD

The disclosure relates to the field of fabrication, and in particular, to fabrication of fuselage sections for aircraft.

BACKGROUND

An airframe defines the mechanical structure of an aircraft. Airframes are made of multiple components that provide desired structural properties. For example, a portion of an airframe for a fuselage of an aircraft may include frames, skin, and stringers that are mechanically coupled together (e.g., via co-bonding, co-curing, or fasteners) in accordance with design parameters. As presently practiced, components of an airframe are fabricated and assembled in predefined cells on a factory floor. For example, in some cases, a skin of an aircraft may be assembled at one cell, and then may be transported to a new cell where frames are installed into the skin to form a section of fuselage.

While the fabrication processes discussed above are reliable, they encounter delays when work at a specific portion of a component is completed more slowly than expected. For example, if a particular portion of a fuselage section takes longer than expected for installation of frames, then it is often progressed to the next cell where the work could be completed out of sequence in what is known as "out of position work." This often delays work in the new cell as the "out of position work" blocks further work in the area of the "out of position work" and then the work needed to be completed in the now completed "out of position work" area can be completed.

Further complicating the fabrication process, stations are typically placed upon either a passenger floor or the cargo floor during work upon the interior of a fuselage section, which complicates the process of mounting and maneuvering these components. Therefore, it would be desirable to have a method and apparatus that take into account at least some of the issues discussed above, as well as other possible issues.

SUMMARY

Embodiments described herein provide techniques and systems that facilitate human interaction with arcuate fuselage segments that traverse a track of an assembly line. The fuselage segments are oriented such that their concavities point towards a floor of the factory, forming an upside-down "U". This enables technicians to easily enter and/or exit a "tunnel" formed by the fuselage segments in order to facilitate inspection and work. Furthermore, in embodiments where the fuselage segments are "pulsed" along the assembly line, the movement of technicians and materials into and out of the tunnel can be performed during pauses between pulses or during pulses.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The fuselage segments discussed herein may be fabricated as composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
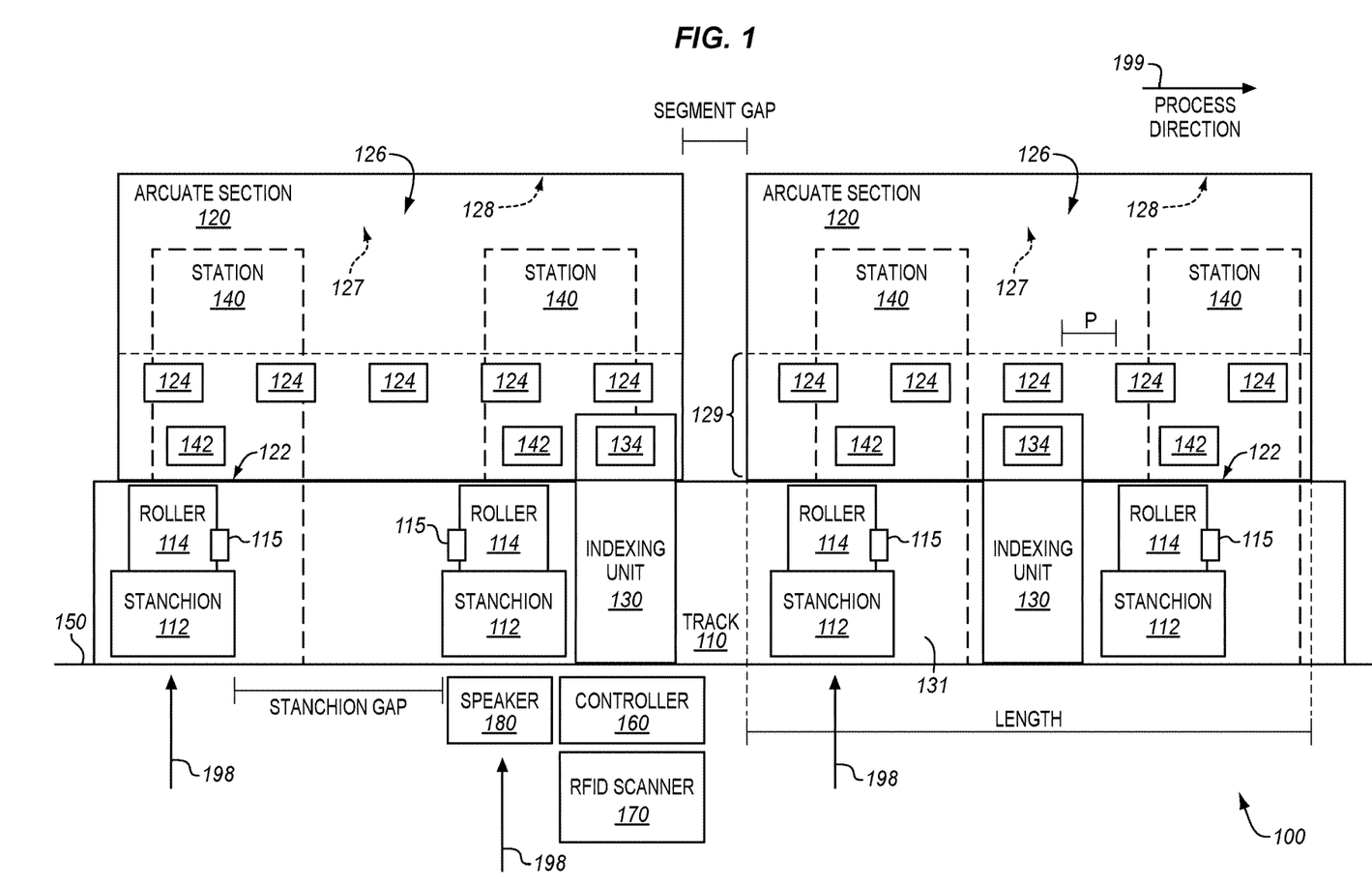
FIG. 1 illustrates a fuselage assembly system in an illustrative embodiment.

FIG. 1 illustrates a fuselage assembly system 100 of a factory in an illustrative embodiment. Fuselage assembly system 100 comprises any system, device, or component operable to iteratively advance/pulse an arcuate section 120 of fuselage 819 (shown in FIG. 9) (e.g., a half-barrel section, or other semi-circumferential segment) a distance less than its length along a track 110. Fuselage assembly system 100 is further capable of performing work at an Inner Mold Line (IML) 128 on the arcuate section 120 while the arcuate section 120 is paused between pulses.

The arcuate section 120 comprises a portion of an airframe, such as a half barrel section of fuselage 819 approximately forty feet long (other lengths are possible, such as twenty-five feet). In some embodiments, the arcuate section 120 comprises a hardened composite part or a metal part, such as a section of the skin of an aircraft awaiting installation of stringers and frames to enhance rigidity. The arcuate section 120 includes an Outer Mold Line (OML) 126 and IML 128, and defines a concavity 127 in which stations 140 (which include work stands 142) are disposed.

In this embodiment, the arcuate section 120 is moved via its bearing edge 122 in a process direction 199 along track 110. The track 110 comprises one or more rails, rollers 114, or other elements that facilitate motion (e.g., rolling or sliding) of the arcuate section 120 along the track 110. The track 110 pulses the arcuate sections 120 of fuselage 819 synchronously in a process direction 199, while holding a shape of the arcuate sections 120 such that concavities 127 face a floor 150 of the factory. That is, the arcuate sections 120 for upper and lower portions of a fuselage 819 are serially aligned and progress along the track 110 such that concavities 127 face a floor 150 of the factory.

In this embodiment, the track 110 includes stanchions 112 (e.g., a discretized series of stanchions (also referred to herein as "pogos"), onto which rollers 114 are disposed. Stanchions 112 are separated by a stanchion gap (referred to in FIG. 1 as "stanchion gap"), which may be three feet, or more, or less, depending upon the work performed in a particular station and personnel or feeder line 198 access to the station 140 between the stanchions 112. The stanchion gap enables technicians to easily enter and/or exit the track 110 without stepping over the stanchions 112. In further embodiments, track 110 is elevated or disposed above technicians such that technicians/personnel and/or materials may pass under the track 110 into a station 140. The bearing edges 122 of the arcuate sections 120 directly contact the rollers 114 of the track 110. The rollers 114 physically support the bearing edge 122 of the arcuate sections 120, and enforce desired contours/lofts onto the arcuate sections 120 by enforcing a distance between each bearing edge 122 without twisting the arcuate section 120 as it progresses down the track 110.

The track 110 further comprises motors 115 that drive the arcuate sections 120 of fuselage 819 (e.g., by spinning the rollers 114, or by pulling the arcuate sections 120). In further embodiments, the track 110 includes a chain drive, motorized cart, powered rollers 114, or other powered system that is capable of moving the arcuate sections 120 in the process direction 199.

FIG. 1 further depicts a Radio Frequency Identification (RFID) scanner 170 disposed at or near the track 110 (e.g., an RFID scanner 170 integrated into a station 140). The RFID scanner 170 identifies a flow of materials and/or personnel into and out of an assembly zone 131 bounded by the track (110), and more importantly into each station 140. That is, input from RFID scanner 170, read from indexing features 124 in the form of RFID chips 372 (shown in FIG. 3) placed upon the arcuate section 120, indicates what materials, components, tools, and/or personnel are needed and will be provided to the station 140 via feeder lines 198 or other systems which are also RFID tracked on each of those feeder lines 198. Indexing features 124 may also be utilized to provide similar information to the station 140, in order to help coordinate the determination of which materials, components, tools, and/or personnel are needed and/or will be provided to the station 140 via feeder lines 198 or other systems which are also RFID tracked on each of the feeder lines 198. This tracking technique enables just-in-time (JIT) delivery of desired parts via RFID chips 372 of FIG. 3, wherein materials are delivered on an as-needed basis to a station 140 without the need for the station 140 to stockpile more than a few hours, or enough of the materials for a single shift or day. Therefore, each item entering a station 140, such as a frame or window surround, etc. can have a unique a RFID chip 372, and the end of the feeder lines 198 and/or receiving stations 140 can include one or more RFID scanners 170 that sends RFID information to the station 140 for use in assembly. On the pre-hardened side, an RFID chip 372 is disposed on a carrier (not shown) that transports the pre-hardened arcuate section. In one embodiment, the RFID scanner 170 reads RFID chips 372 disposed at the materials to determine what has entered and exited the station 140 and even the assembly zone 131. In a further embodiment, the RFID scanner 170 also tracks a flow of personnel into and out of the assembly zone 131 by reading the RFID chips 372 worn by the personnel (not shown).

Stations 140 are disposed beneath the concavities 127, and include work stands 142 that physically support at least one technician and are directly mounted to the floor 150 of the factory. As the arcuate sections 120 are pulsed, the concavities 127 advance over the stations 140 in the process direction 199. In this manner, technicians at the stations 140 acquire access to new portions of the IML 128 as new portions of the arcuate sections 120 come into the purview of the station 140. Each station 140 is suited to/specialized for a different type of task (e.g., drilling, lock-bolt installation, trimming, sealing, inspection, etc.), and may include specialized tooling to facilitate these tasks. In some embodiments, the stations 140 include work stands 142 that are extensible (e.g., via an automated actuator, via a spring-loaded peg and hole system etc.), and include safety stops and/or control programs that limit the range of positions or heights provided during operation in order to avoid collisions with an arcuate section 120. This ensures that the stations 140 and/or technicians do not collide with the arcuate sections 120 during assembly. In further embodiments, stations 140 are used on the floor grid install cell and the crown module install cell. However, stations 140 can be used anywhere there is access to the interior of the arcuate section 120 from the floor 150 of the factory. Depending on embodiment, the stations 140 contemplated herein can be a few feet long, four feet long or six feet or more tall. The stations 140 are each sized to accommodate a particular type of work in to be performed on the arcuate section 120. The stations 140 are also sized to facilitate egress and ingress of personnel and/or materials (e.g., consumable materials) for the station 140. In further embodiments, the stations 140 are sized to accommodate a particular type of work, such as drilling, frame installation, assembly, etc.

Fuselage assembly system 100 further comprises indexing units 130. Each indexing unit 130 is designed to physically couple with an indexing feature 124 (e.g., a machined feature, such as a hole or slot) in the arcuate section 120. The indexing features 124 are placed at known locations along the arcuate section 120, and in one embodiment each of the indexing features 124 is separated by the same distance along the arcuate section 120. In further embodiments, the indexing features 124 are disposed in a manufacturing excess 129 of the arcuate section 120, which is trimmed away prior to the arcuate section 120 entering service.

In further embodiments, tracking with an RFID chip 372 is used for indexing. That is, an RFID chip 372 can be used for indexing by mounting a Radio Frequency Identification (RFID) scanners 170 upon the arcuate section 120 and reading RFID information as part of the indexing of the portion of the arcuate section 120 within the purview of a particular station. In such an embodiment, the RFID chips 372 themselves are the indexing features, and are serially located, (e.g., linearly aligned or non-linearly aligned) upon a manufacturing excess 129 of the arcuate section 120. The RFID chip 372 aligns with each of the serially located stations 140 (or automated work stations) and communicate specifics desired for 3D characterization of the arcuate section 120. In some embodiments, these RFID chips 372 also include instructions for work to be performed by a station 140. For example, in an embodiment where stations 140 work on different arcuate sections of an upper fuselage (not shown) followed by different arcuate sections of a lower fuselage (not shown), followed by different section of another model of aircraft, the RFID chip 372 embedded into each arcuate section 120 communicates to the station 140 what, if any work needs to be completed on the particular arcuate section 120 (and/or portion thereof) presently within the purview of the station 140.

In this embodiment, each of the indexing units 130 includes a complementary feature 134 for insertion into, grasping, or otherwise interacting with an indexing feature 124 disposed at a manufacturing excess 129 of the arcuate sections 120. Indexing units 130 are placed at fixed, known locations relative to the station 140 and/or even the track 110. During assembly, the arcuate section 120 is pulsed a distance (e.g., a distance at least equal to a distance less than the length of the arcuate section 120 and as short as a fraction of the frame pitch), indexed to the indexing units 130, and worked upon by one or more technicians, or one or more robots or mechanisms within the concavity 127. That is, the arcuate section 120 is pulsed to an indexed location. Whenever the indexing features 124 in the arcuate section 120 and the complementary features 134 in the indexing units 130 are mated, the location of the arcuate section 120 is indexed to a known location in a coordinate space shared by the track 110, the indexing units 130, and stations 140 within the concavity 127. Indexing via RFID chip 372 makes a station 140 aware of the 3D characteristics of the particular portion or the arcuate section 120 within the purview of the station 140. The work to be performed by the station 140 on the particular portion or the arcuate section 120 within the purview of the station 140 is also communicated to the station 140. Specifically, each indexing unit 130 is disposed at a known offset (e.g., along three axes) from a station 140, meaning that the act of indexing an arcuate section 120 to the indexing units 130 causes the position of the arcuate section 120 relative to the station 140 to be known (i.e., because the indexing unit 130 is at a known position relative to the arcuate section 120, and the indexing unit 130 is at a known offset to a station 140). The indexing units 130 may also be disposed at specific stations 140 as desired. In one RFID indexing scenario, indexing combined with RFID scanning, is used to communicate an upstream 3D scan of an arcuate section 120 to the station 140, and further indicates work to be performed by the station 140 on the particular portion or the arcuate section 120 within the purview of the station 140.

In one embodiment, indexing is performed at least according to the following description. A structure in the form of an arcuate section 120 is carried upon a track 110 comprising a set of stanchions 112 affixed to the floor 150 of the factory. The arcuate section 120 has been fabricated on a layup mandrel according to precise dimensions, and this precise layup enables indexing features 124 (and/or RFID) to be precisely located in a manufacturing excess 129 of the arcuate section 120. Thus, once the arcuate section 120 is located on the precisely located stanchions 112 (and possibly an additional Inner Mold Line (EVIL) or Outer Mold Line (OML) forcing tool), the 3D position and orientation of the arcuate section 120 is precisely known when the indexing feature 124 is engaged, without the need for a full scan via probes or optical technology at each station 140 and/or work stands 142 therein.

The relative stiffness of the de-molded or otherwise formed arcuate section can be relied upon to help the arcuate section 120 maintain a desired loft/EVIL 128/OML 126 along with the precisely located railing and without the need for any substantial shape defining tooling during pulsed assembly. In this arrangement, the indexing features 124 are located precisely on or into the arcuate section 120 relative to the loft/EVIL 128/OML 126 of the arcuate section 120 and the precisely located rails help convey the arcuate section 120 from station 140 to station 140 without distortion. Therefore, a 3D position and orientation of the arcuate section 120 (e.g., including loft/IML 128/OML 126) is known quickly and precisely (i.e., indexed) after each pulse without the need to re-scan the arcuate section 120 each time the arcuate section 120 is advanced. The indexing may be performed at multiple stations 140 during a pause between pulsing of the arcuate section 120, and multiple stations 140 may be indexed to the same arcuate section in order to perform a greater density of work during a pause of the arcuate section 120.

Because of the precise indexing performed, the technicians and/or automated systems at each station 140 are able to know exactly where to locate and/or position tools at the station 140 relative to the arcuate section 120 based on information conveyed to the station 140 and/or tooling thereat, as well as what actions to perform the arcuate section 120, when the arcuate section 120 is within the purview of indexing unit 130. The 3D position and orientation, and/or the loft/IML 128/OML 126 of the arcuate section 120 is then established or indexed into any Numerical Control (NC) programming or automated system in use at the station 140 (and any stations disposed therein). Therefore, less setup time or scanning is needed after each pulse of the arcuate section 120. Furthermore, structure added to or removed from the arcuate section 120 in the prior station 140 may be added to whatever arcuate section model or representation is within the system, without the need to scan the arcuate section 120 for the changes.

That is, the indexing of an arcuate section 120 may be performed by aligning the arcuate section 120 to the indexing unit 130. The stations 140 have a known relationship with the indexing unit 130, so this also indexes the arcuate section 120 to the stations 140 directly or indirectly. When the two are in a known relationship, technicians at the stations 140 are indexed to the arcuate section 120, because a known relationship exists between the stations 140 and the arcuate sections 120. Thus, indexing an arcuate section 120 of fuselage 819 may include mating an indexing feature 124 at an arcuate section 120 with a complementary feature 134 at an indexing unit 130 having a known physical offset from the stations 140, such that the mating instantly results in the arcuate section 120 having a known location (e.g., characterizing desired 3D characteristics of the section of the arcuate section 120 being indexed) relative to the stations 140. This is because the complementary features 134 at the indexing unit 130 are pre-located and sized to fit while the arcuate section 120 is at a specific and precisely determined location.

The operations of the track 110, stations 140, and/or other components are managed by controller 160. In one embodiment, controller 160 determines a progress of the arcuate section 120 along the track 110 (e.g., based on input from a technician, in accordance with an automated process such as input from a camera or physical sensor, such as a linear or rotary actuator), and uses this input to manage the operations of the various components in accordance with instructions stored in a Numerical Control (NC) program. Controller 160 may be implemented, for example, as custom circuitry, as a hardware processor executing programmed instructions, or some combination thereof. In further embodiments, controller 160 operates one or more speakers 180 to indicate that a pulse is about to begin.

Illustrative details of the operation of fuselage assembly system 100 will be discussed with regard to FIGS. 2A-2B. Assume, for this embodiment, that the arcuate section 120 of fuselage 819 (e.g., arcuate sections, one-third barrel sections, or any suitable circumferential fraction) has been demolded and awaits assembly work such as trimming, frame installation, inspection, or other activities.

Figure 2A:
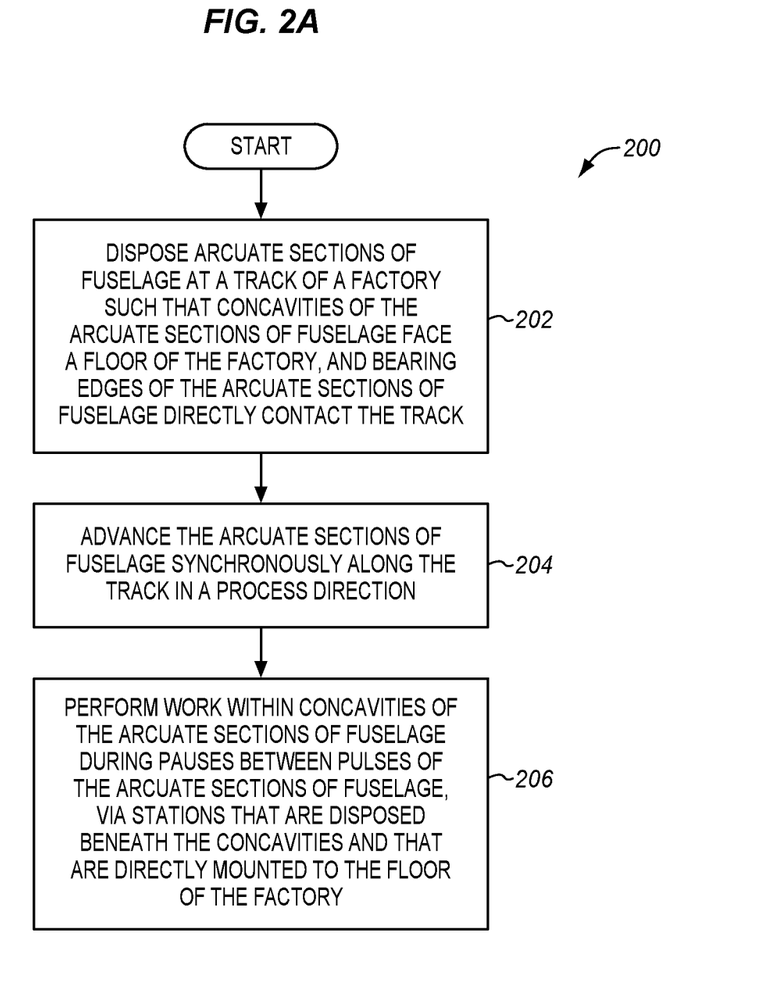
FIGS. 2A-2B are flowcharts illustrating a method of operating a fuselage assembly system in an illustrative embodiment.

FIG. 2A is a flowchart illustrating a method 200 of operating a fuselage assembly system 100 in an illustrative embodiment. The steps of method 200 are described with reference to fuselage assembly system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, the arcuate sections 120 (e.g., half-barrel sections) are disposed at a track 110 of a factory such that concavities 127 of the arcuate sections 120 face a floor 150 of the factory, and the bearing edges 122 of the arcuate sections 120 directly contact the track 110. Phrased another way, the arcuate sections 120 form an upside-down "U" shape. At each end of the upside-down "U", a bearing edge 122 is held/supported by rollers 114 of the track 110, and directly contacts these rollers 114. In one embodiment, securing the arcuate sections 120 to the track 110 comprises placing the arcuate sections 120 onto the track 110 such that the bearing edges 122 are held in place by the rollers 114.

In step 204, the arcuate sections 120 are advanced (e.g., pulsed) synchronously along the track 110 in a process direction 199. In one embodiment, pulsing the arcuate sections 120 comprises pulsing the arcuate sections 120 by a distance between indexing features 124 that are adjacent with respect to each other. In a further embodiment, the arcuate sections 120 are pulsed by a frame pitch (i.e., a distance between frames that will be placed into a section), although any suitable pulse distance may be utilized. For example, the pulse distance may comprise a full length of the arcuate section 120 or some fraction less than the full length. In one embodiment, a gap of at least three feet or some other multiple of a pulse length less than a length of the arcuate section 120 is left between the arcuate sections 120 of fuselage 819 during the pulsing. This enables technicians to exit the stations 140 during a time when the station 140 is not occupied by an arcuate section 120. Maintenance may also be performed during these "down periods" for the stations 140. Furthermore, technicians may exit the stations 140 by passing under the bearing edge 122 or out the end of the arcuate section 120 next to the station 140.

In step 206, work is performed within the concavities 127 of the arcuate sections 120 during pauses between pulses of the arcuate sections 120. The work is performed via stations 140, which are disposed beneath the concavities 127 and that are directly mounted to the floor 150 of the factory. In some embodiments, pauses between pulses last for several to many minutes (e.g., fifteen to thirty minutes), or one to two hours. These pauses are equal for all stations. During these pauses, technicians at the stations 140 perform work on the IML 128 of the arcuate sections 120. That is, the stations 140 provide access to IML work areas. Additional technicians at stations 140 disposed outside of the track 110 perform additional work, and machines may also engage in work at the arcuate sections 120 to perform operations such as trimming, cutting, frame installation, etc.

After the pause is completed, work proceeds to step 204 and the arcuate sections 120 are pulsed (e.g., by a distance equal to their length, by a frame pitch or other distance less than their length, etc.). In certain embodiments, such as environments wherein a floor grid is installed, an arcuate section 120 is held at a single station for one or more pulses in order to receive additional work multiple times. Thus, in one embodiment, controller 160 is aware of the amount of time assigned to each pulse, and determines that a pulse of the arcuate sections 120 of fuselage 819 will occur within a threshold period of time (e.g., within one minute, ten seconds, etc.). Controller 160 then operates speaker 180, which delivers an auditory and/or visual warning during the threshold period of time to ensure that technicians and materials do not block the progress of the arcuate sections 120 and that all technicians are aware that the arcuate sections 120 are about to advance.

Method 200 provides a technical benefit by enabling personnel, tooling as well as stations 140 and any work stands 142 to remain stationary while large arcuate sections of fuselage 819 (e.g., tens of feet long) are transported. Furthermore, the work stations (e.g., stations 140) do not have to be removed and then set up again after each pulse of the arcuate section 120 of fuselage. This enables stations 140 and work stands 142 to be specialized for a variety of tasks without needing to be mobile. Still further, because multiple stations 140 are disposed within a concavity 127 of a single fuselage arcuate section, a large number of types of work (e.g., drilling, trimming, sealing, etc.) can be performed during the same pause across various portions of the arcuate sections 120 of fuselage 819 that are within the purview of multiple stations 140.

The stations 140 include work stands 142 that are customized to the work performed within the particular station. This feature increases assembly speed as well as work density on the floor 150 of the factory, because many assembly operations may be performed upon the arcuate section 120 of fuselage 819 at the same time during pauses between pulses, thereby increasing work density. This fuselage assembly system 100 brings the arcuate section 120 to the technicians, any stands, and tooling, rather than bringing the technicians and tooling to the arcuate section 120. The access provided to technicians through the inverted "U" of the arcuate section 120 (i.e., concavity 127), permits a fixed work stand 142 and associated tooling, while enabling the arcuate section 120 to move relative to station 140 and expose new portions to a purview of the station 140. This saves transport time and repeated setup of technician, tooling and stands at multiple locations along an arcuate section 120. Still further, method 200 enables transport time for an arcuate section 120 to be transformed into value-added time wherein work is performed on the arcuate section 120.

Figure 2B:
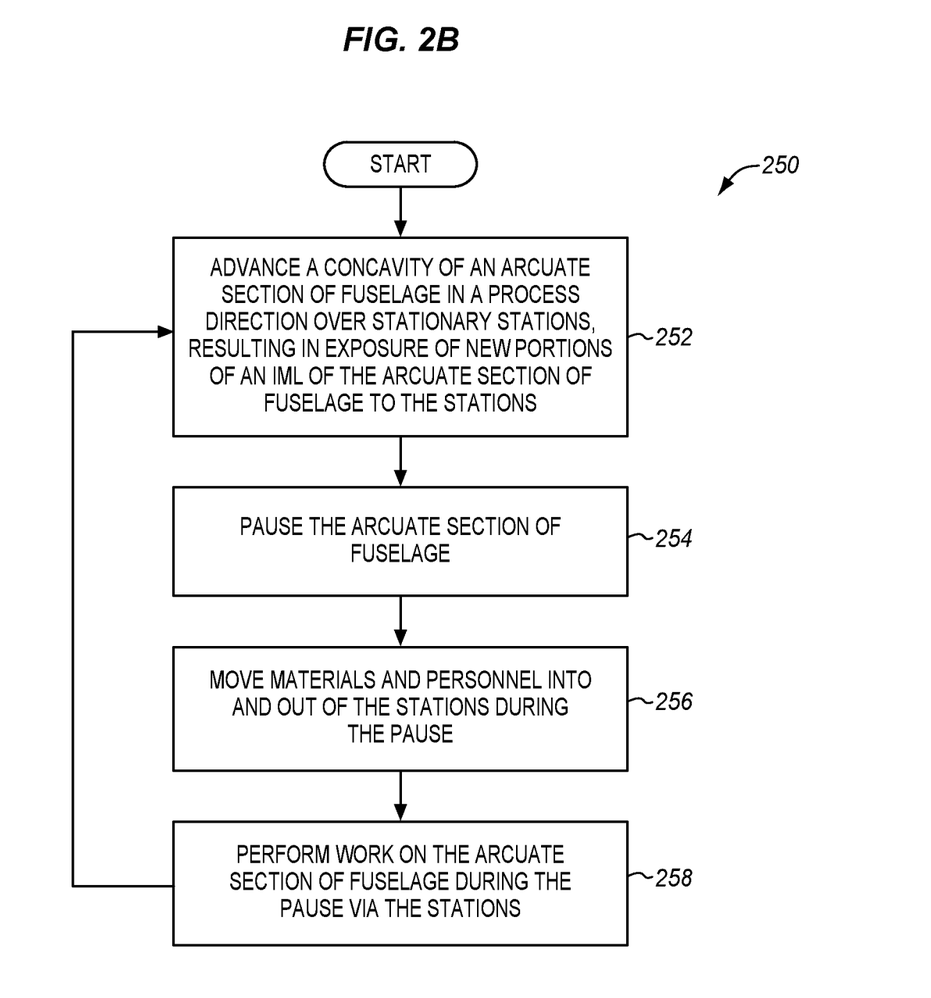

FIG. 2B is a flowchart illustrating a method 250 of operating a fuselage assembly system 100 in an illustrative embodiment. Step 252 includes advancing a concavity 127 of an arcuate section 120 of fuselage 819 in a process direction 199 over stations 140, resulting in exposure of new portions of an IML 128 of the arcuate section 120 to the stations 140. Step 254 includes pausing the arcuate section 120 of fuselage. Step 256 comprises moving materials (e.g., fasteners and sealant that are consumed during additive manufacturing and not used as tooling) and personnel into and out of the stations 140 during the pause. While the materials may be moved in during the vast majority of pauses, the technicians need not move into and out of the stations 140 during each pause. In one embodiment, this comprises moving the materials and personnel into and out of the stations 140 by entering or exiting underneath ends of the arcuate section 120. In a further embodiment, this comprises advancing the materials and personnel underneath a bearing edge 122 of the arcuate section 120 that is supported by a track 110 (e.g., between stanchions 112, via holes/chutes underneath a floor 150 of the factory, etc.). These techniques and others may be utilized in order to supply materials from feeder lines 198 to the stations 140. Step 258 comprises performing work on the arcuate section 120 of fuselage 819 during the pause via the stations 140. Method 250 may be repeated iteratively for each of a series of the arcuate sections 120 of fuselage 819 arranged in series, such that the series of the arcuate sections 120 advances iteratively in a process direction 199 synchronously. Furthermore, the pauses are synchronized between the arcuate sections 120 to create uniform periods during which the stations 140 are operated.

Figure 3:
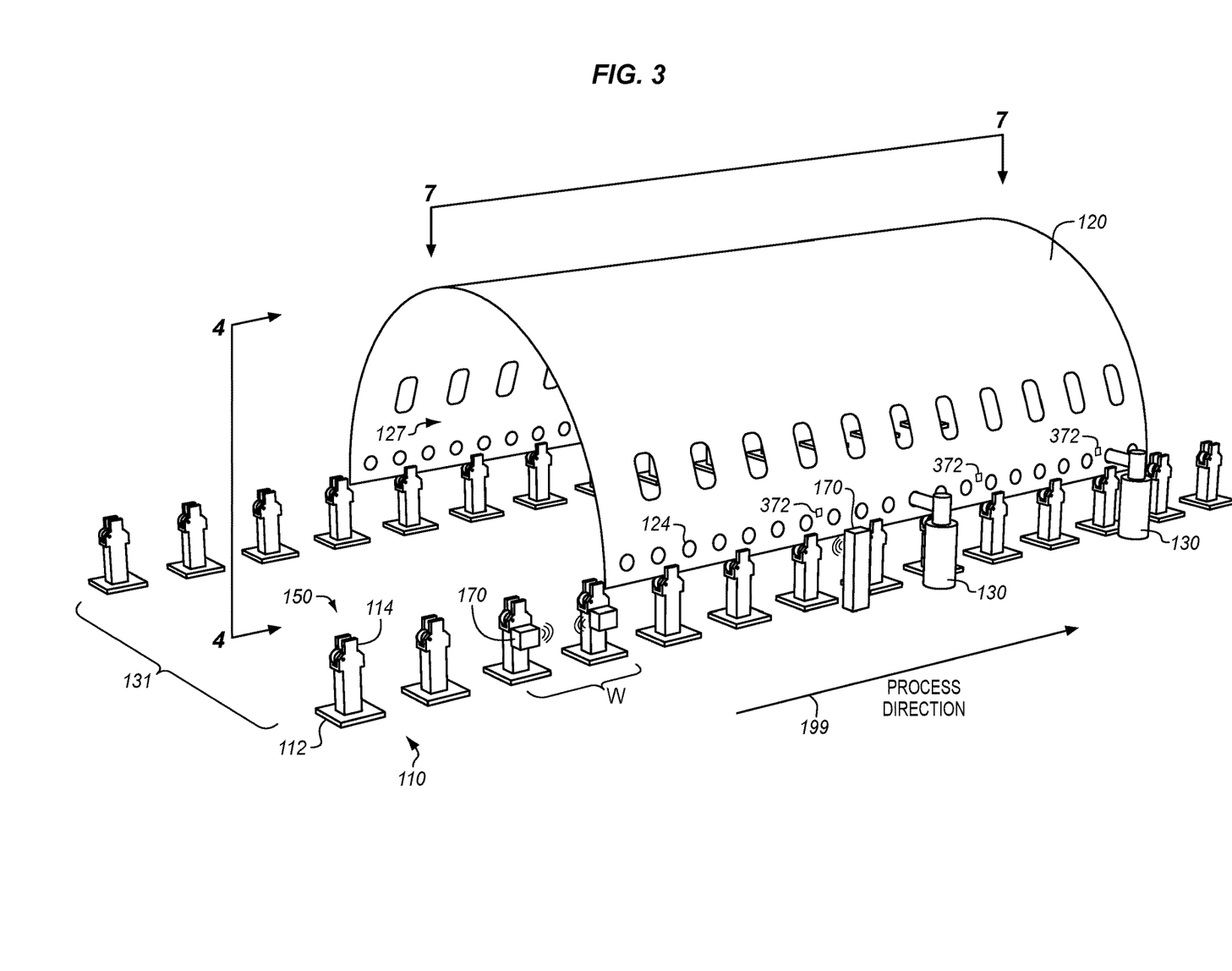
FIG. 3 is a perspective view of a section of fuselage traveling through a fuselage assembly system in an illustrative embodiment.

FIG. 3 is a perspective view of an arcuate section 120 of fuselage (e.g., fuselage 819 shown in FIG. 9) traveling through a fuselage assembly system 100 in an illustrative embodiment. In this embodiment, the arcuate section 120 includes a concavity 127, as well as indexing features 124 which index to indexing units 130. Track 110 includes multiple stanchions 112 which each include rollers 114 that secure and drive the arcuate section 120 in a process direction 199.

FIG. 3 further depicts a floor 150 of a factory, and Radio Frequency Identification (RFID) scanners 170. RFID scanners 170 detect the passage of materials (e.g., frames, scrap material, tools, etc.) and/or personnel into and out of an assembly zone 131, by reading/scanning the RFID chip 372 disposed on/attached to the materials or worn on the personnel. Furthermore, one or more RFID scanners 170 detect RFID chips 372 embedded in a manufacturing excess 129 of the arcuate section 120. Based on information detected in the embedded RFID chips, 3D characteristics of the arcuate section 120 are determined for each of its lengthwise portions, and instructions may also be determined therefrom.

Figure 4:
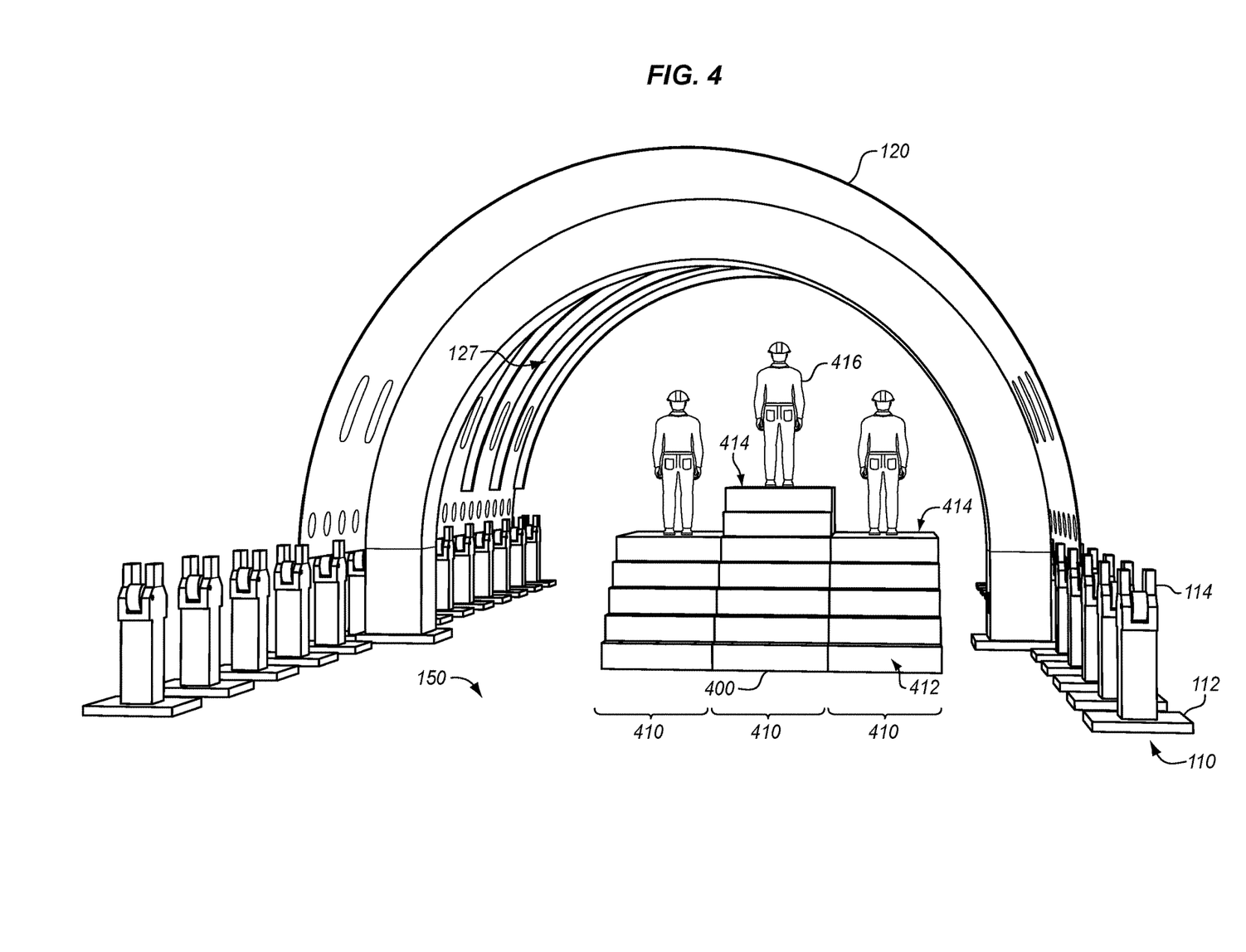
FIG. 4 is a front view of a work stand for a fuselage assembly system in an illustrative embodiment.

FIG. 4 is a front view of a work stand 400 for a fuselage assembly system 100 in an illustrative embodiment, and corresponds with view arrows 4 of FIG. 3. In FIG. 4, the work stand 400 is subdivided into segments 410, which each physically support a technician 416 at a platform 414. The platforms 414 are accessible via steps 412. The work stand 400 is directly secured to floor 150 of the factory, such as via bolts or other fasteners. This arrangement means that the work stand 400 need not be affixed to the arcuate section 120 of fuselage 819, and further enables a technician to rapidly and easily ascend to inspect concavity 127 directly from the floor 150 of the factory. This arrangement also ensures that a position of the work stand 400 is precisely known relative to the track 110. Thus, a technician 416 is capable of working upon the concavity 127 by installing frames, window and/or door surrounds or other interior work. In further embodiments, the stations have a specialized configuration suitable for the work being performed at that station that includes the work stand 400. The work stands 400 can also be implemented in stationary cells such as a crown module cell or floor grid install cell.

Figure 5:
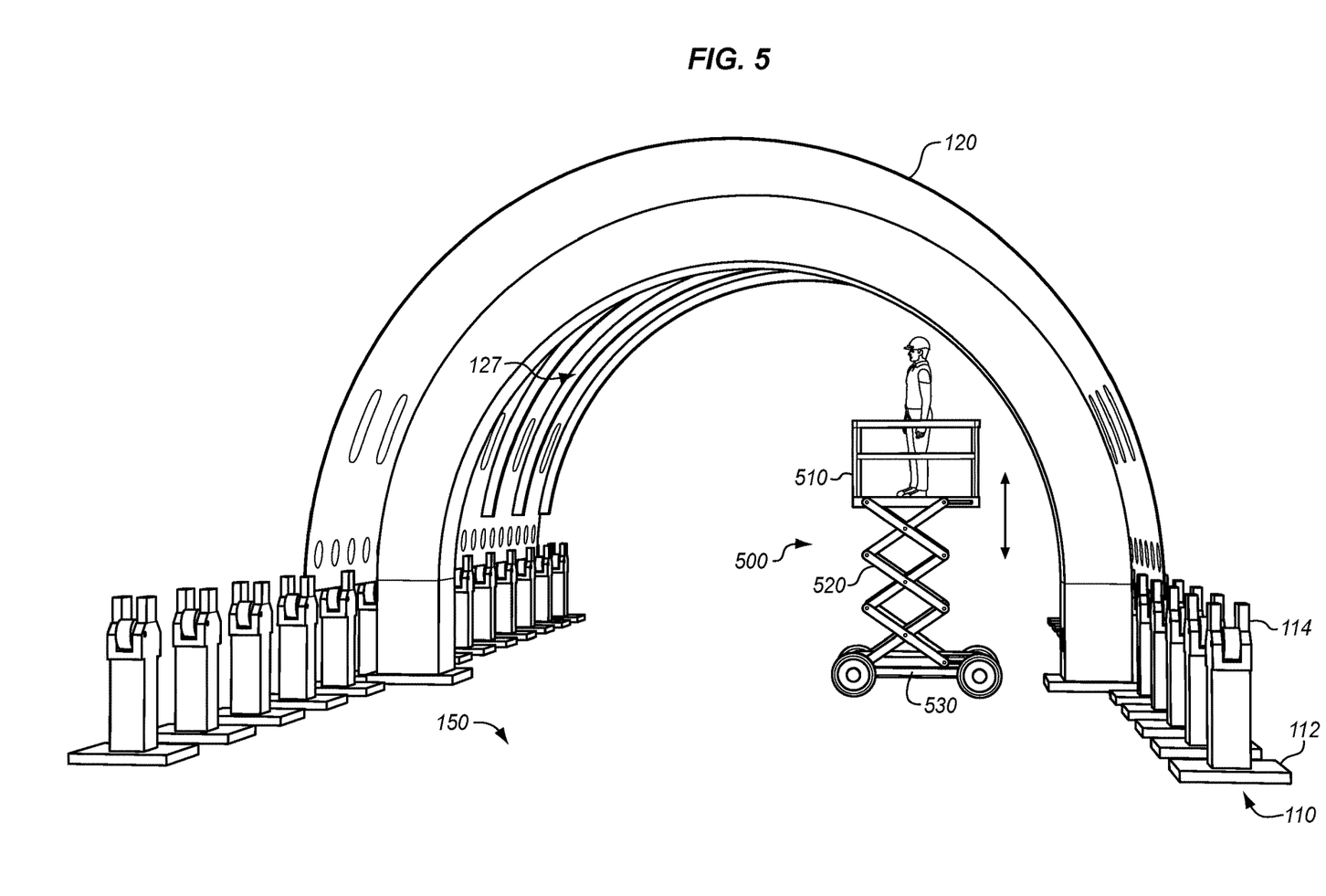
FIG. 5 is a front view of an extensible work stand for a fuselage assembly system in an illustrative embodiment.

FIG. 5 is a front view of an extensible work stand 500 for a fuselage assembly system 100 in an illustrative embodiment, and corresponds with view arrows 4 of FIG. 3. Extensible work stand 500 includes a base 530 that is directly affixed to the floor 150 of the factory. Arms 520 extend from the base 530, and are driven to adjust a vertical position of platform 510 relative to a concavity 127. In this manner, adjusting a vertical position of the extensible work stand 500 moves a technician at the extensible work stand 500 towards the concavity 127 of the section of fuselage. This enables a technician to controllably ascend and inspect the concavity 127. From this position, the technician can also perform work upon the concavity 127 including installing frames, window and/or door surrounds or other interior work. The extensible work stand 500 can exhibit a specialized configuration suitable for the particular work station and the work being performed at that station 140. In further embodiments, extensible work stand 500 is numerically controlled and includes safety sensors that prevent extension amounts which would result in a collision with concavity 127.

Figure 6:
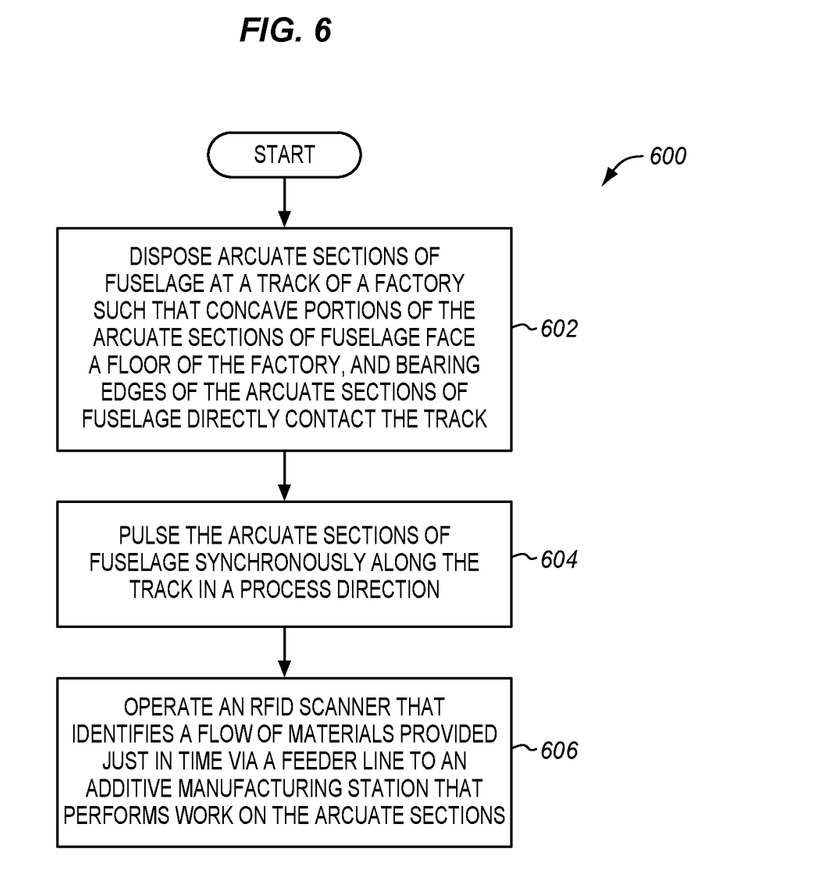
FIG. 6 is a flowchart illustrating a further method of operating a fuselage assembly system in an illustrative embodiment.

FIG. 6 is a flowchart illustrating a further method 600 of operating a fuselage assembly system 100 in an illustrative embodiment. In step 602, arcuate sections of fuselage 819 (e.g., the arcuate sections 120) are disposed at a track 110 of a factory such that concavities 127 of the arcuate sections 120 of fuselage 819 face a floor 150 of the factory. The bearing edges 122 of the arcuate sections 120 of fuselage 819 directly contact the track 110. Phrased another way, the arcuate sections 120 form an upside-down "U" shape. At each end of the upside-down "U", a bearing edge 122 is held/supported by rollers 114 of the track 110, and directly contacts these rollers 114. In one embodiment, securing the arcuate sections 120 to the track 110 comprises placing the arcuate sections 120 onto the track 110 such that the bearing edges 122 are held in place by the rollers 114.

In step 604, the arcuate sections 120 of fuselage 819 are pulsed synchronously along the track 110, concavity 127 oriented downward, in a process direction 199. In one embodiment, pulsing the arcuate sections 120 of fuselage 819 comprises pulsing the sections by a distance between indexing features 124 that are adjacent to each other. In a further embodiment, the arcuate sections 120 are pulsed by a frame pitch (i.e., a distance between frames that will be placed into the fuselage sections), although any suitable pulse distance may be utilized. During pauses between pulses, materials are passed through a passageway that proceeds to an assembly zone 131, and the RFID scanner 170 is disposed at the passageway. In this way, the materials are passed through a gap between the arcuate sections 120 of fuselage 819 during pauses between the pulses.

In step 606, an RFID scanner 170 is operated. The RFID scanner 170 identifies a flow of materials provided Just In Time (JIT) via a feeder line 198 to an additive manufacturing station (e.g., a station 140). As used herein, materials are provided JIT if they are provided on an as-needed basis to a station 140, without the station 140 needing to pause or delay operations awaiting receipt of materials. At the same time JIT delivery of materials also indicates that a station 140 does not need to maintain a substantial stockpile of materials (e.g., materials for more than an hour or day of operations). The materials are provided into and out of an assembly zone 131 bounded by the track 110. In one embodiment, operating the RFID scanner 170 comprises reading the RFID chips 372 disposed at the materials.

In further embodiments, the RFID scanners 170 are disposed at a predefined entry or exit point for the assembly zone 131. This ensures that materials pass by the RFID scanner 170 and are capable of being detected. The materials comprise consumable materials, materials that are integrated into the airframe (e.g., frames for the fuselage), tools, sensors, scrap material, or any other components capable of receiving an RFID chip 372.

In one embodiment, the RFID chips 372 uniquely identify each type and/or instance of material from others, which enables tracking of different types of materials, instances of materials, etc. That is, RFID chips 372 used herein are structured to include an identifier for the type of thing that they accompany (e.g., frame, fastener, tool, etc.), as well as a serial number for that type. This uniquely identifies each incoming component, which is highly beneficial in tracking and ensuring delivery times for Just-In-Time (JIT) feeder lines which provide materials and/or tools to stations 140. The JIT delivery of each component to each station is tracked with RFID chips 372. Therefore, each item entering the station, such as a frame or window surround, etc. has an RFID chip 372 that provides uniquely identifiable RFID information, and the feeder line 198 can include a RFID scanner 170 that transmits RFID information to stations 140 for use in assembly. In further embodiments, RFID chips 372 are also worn by personnel, which enables tracking of personnel at the assembly zone 131. In this manner, the RFID scanner 170 is operated to track the flow of personnel into and out of the assembly zone 131 bounded by the track 110, for example, by reading the RFID chips 372 worn by the personnel.

Figure 7:
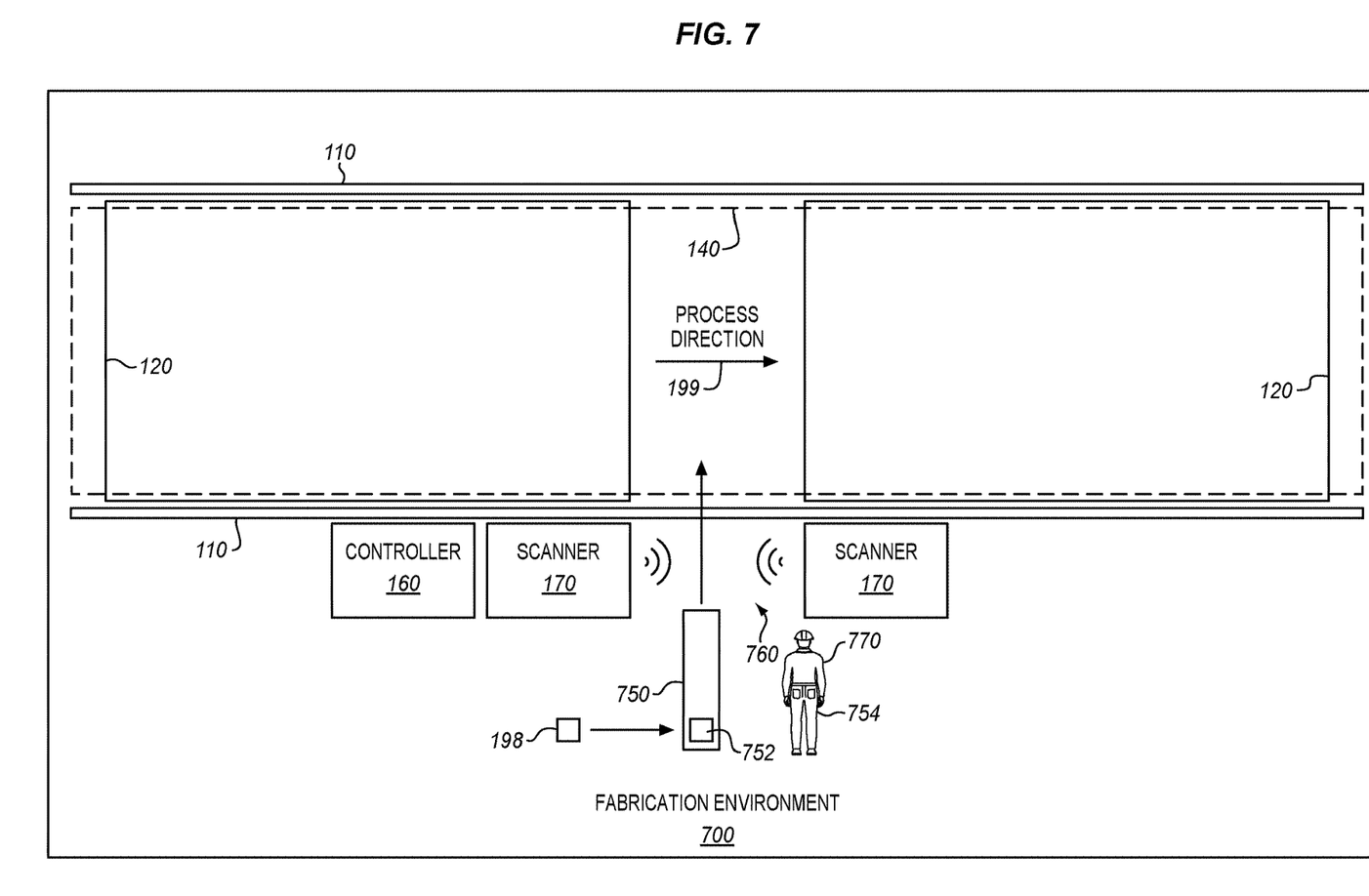
FIG. 7 depicts Radio Frequency Identification (RFID) scanners that track the movement of materials and/or personnel into and/or out of an assembly zone in an illustrative embodiment.

In further embodiments and as discussed in FIG. 3, tracking via RFID can be used to facilitate indexing. In such an embodiment, an RFID chip 372 is mounted to an arcuate section 120 and read as part of indexing a lengthwise portion of the arcuate section 120 within the purview of a particular station. The RFID chip 372 operates as a serially located indexing feature 124 at the manufacturing excess 129 of the arcuate section 120, but does not have to be linearly aligned with other RFID chips 372. The RFID chip 372 aligns with each of the serially located stations 140 and communicates specifics of the 3D characterization stored at the controller 160 of the arcuate section 120 as well as instructions for the station 140. FIG. 7 depicts multiple Radio Frequency Identification (RFID) scanners that track the movement of materials and/or personnel into and/or out of an assembly zone 131 of a fabrication environment 700 in an illustrative embodiment. Thus, input from the RFID scanners 170 may be utilized to determining the personnel within a station 140 (e.g., an additive manufacturing station) at any point in time, or to determine the material within the station 140 at any point in time.

FIG. 7 presents a top view which corresponds with view arrows 7 of FIG. 3. In FIG. 7, RFID scanners 170 are disposed beyond the boundaries of a track 110, and are located in a passageway 760 that leads to station 140. The arcuate sections 120 of fuselage 819 proceed in a process direction 199, and intermittently block the passageway 760. However, multiple sets of passageways 760 and RFID scanners 170 are disposed at intervals which ensure that at least one of the passageways 760 is always available during pulsing in order to scan incoming and outgoing materials. In a further embodiment, there is no need for a RFID scanner 170 on each side of the passageway to scan a flow of materials and RFID chips 752 in order for these materials to be detected by RFID scanners 170. The RFID scanners 170 need not be attached to stanchions 112, but should be located relative to the passageway.

Materials 750 arrive from feeder lines 198, and can include structural elements such as frames, window/door surrounds, or even fasteners. The RFID chip 752 for fasteners can be placed in a container or otherwise associated with the fasteners. The materials 750 enter and exit the station 140 via the passageway 760, at which point radio energy from the RFID scanners 170 activates an RFID chip 752 coupled with the material 750 (e.g., affixed onto via a removable adhesive, made integral with the material, on packaging accompanying the material, etc.) moving relative to (e.g., into or out of) the station 140, or RFID chips that are coupled to personnel moving relative to the station 140.

FIG. 7 further depicts technician 770, who is one of many personnel that wears an RFID chip 754 (e.g., on a badge, article of clothing, article of safety equipment, etc.) that enables tracking as the technician proceeds through the passageway 760. Controller 160 tracks readings acquired by the RFID scanners 170 to determine the (personnel and material) contents of within stations or stations (not shown) of the station 140 at any point in time. In one embodiment, controller 160 is coupled to an RFID scanner 170 and also operates a feeder line 198 that supplies a flow of materials to the station 140. The RFID scanner 170 is coupled to the feeder line 198. Based on input from the RFID scanner 170, the controller 160 controls a rate at which material enters the stations and/or stations of the station 140, by controlling the takt time of the feeder line 198 that feeds material 750 being input into stations or stations at the station 140. In one embodiment, a rate of flow from a feeder line 198 into the station 140 is based on a feedback control of a takt time of the feeder line 198 performed by the controller 160. That is, if material is flowing at a rate that is too quick or too slow to the station 140, then controller 160 may direct the feeder line 198 to decrease or increase a fabrication/delivery rate as necessary.

In a further embodiment, certain ones of the passageways 760 serve as dedicated entryways, and others serve as dedicated exits. This increases the ease with which a controller 160 determines whether a technician or material has entered or exited. That is, a detection of an RFID chip 752 at an exit indicates that the material is leaving the station 140, while detection of an RFID chip 752 at an entrance indicates that the material is entering the station 140. If an RFID chip 752 is identified at an exit but has not yet been determined to have entered the assembly zone 131, controller 160 may assume that the associated material or personnel is entering the assembly zone 131, update tracking data, and/or may chirp a speaker 180 to indicate an attempted entry via a passageway intended for use as an exit.

In still further embodiments, controller 160 maintains a real-time list of materials and personnel within the assembly zone 131, based on the detected RFID chips 752. Controller 160 further generates reports with these lists, and transmits them to personnel electronically for review. Based on input from the personnel, controller 160 resolves conflicts in the lists, and/or emits notifications via speakers 180 and/or visual signals in the assembly line.

The arrangement shown in FIG. 7 allows controlling a rate of flow from a feeder line 198 into an additive manufacturing station based on feedback-based control of a takt time of the feeder line 198. It also allows for determining material or personnel within the additive manufacturing station (e.g., by operating an RFID scanner 170 by reading the RFID chips 752 coupled to/worn by personnel or coupled to materials). The arrangement further enables passing of materials through a passageway into the additive manufacturing station, passing materials and/or personnel under the track 110 into the additive manufacturing station, passing personnel through a gap between the arcuate sections 120 of fuselage 819 during the pauses between pulses during the pulsing etc.

Examples

In the following examples, additional processes, systems, and methods are described in the context of a fuselage assembly system 100.

Figure 8:
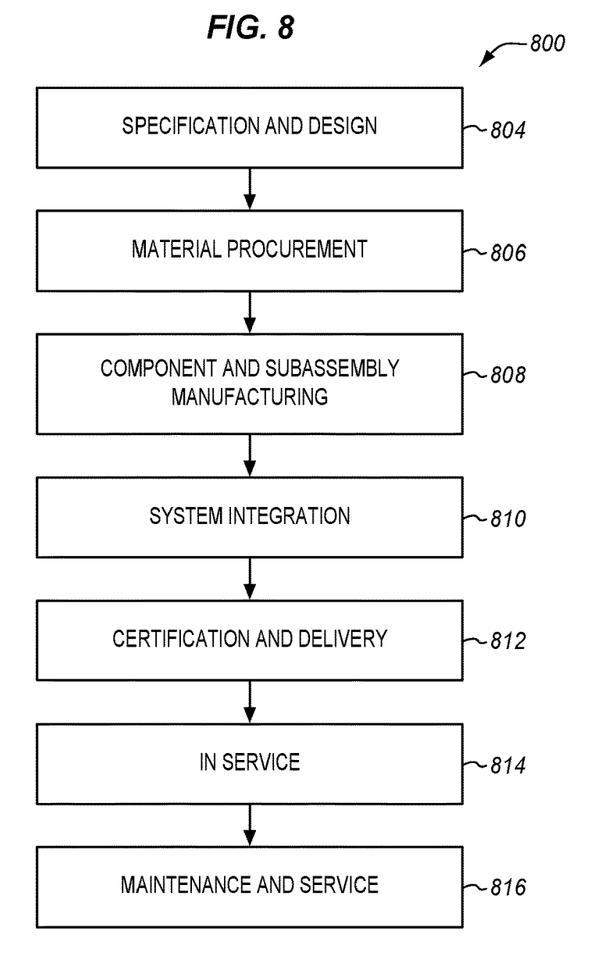
FIG. 8 is a flow diagram of aircraft production and service methodology in an illustrative embodiment.
Figure 9:
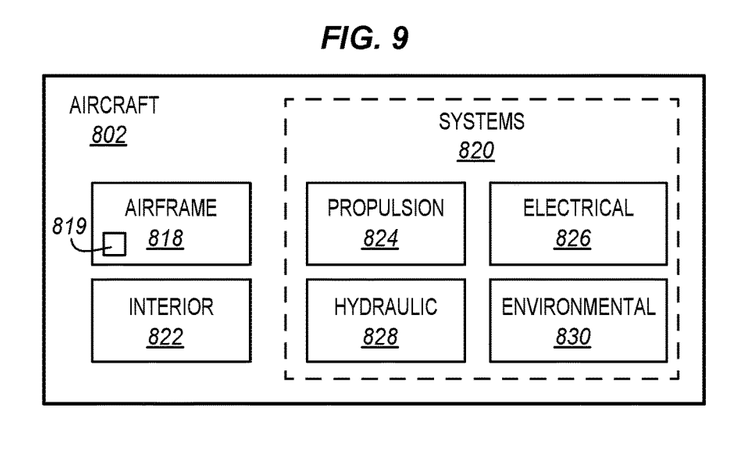
FIG. 9 is a block diagram of an aircraft in an illustrative embodiment.

Referring more particularly to the drawings, embodiments of the disclosure may be described in the context of aircraft manufacturing and service in method 800 as shown in FIG. 8 and an aircraft 802 as shown in FIG. 9. During pre-production, method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine work in maintenance and service 816 (which may also include modification, reconfiguration, refurbishment, and so on). Apparatus and methods embodied herein may be employed during any one or more suitable stages of the production and service described in method 800 (e.g., specification and design 804, material procurement 806, component and subassembly manufacturing 808, system integration 810, certification and delivery 812, service 814, maintenance and service 816) and/or any suitable component of aircraft 802 (e.g., airframe 818, systems 820, interior 822, propulsion system 824, electrical system 826, hydraulic system 828, environmental 830).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by method 800 may include an airframe 818 with a plurality of systems 820 and an interior 822. Examples of systems 820 include one or more of a propulsion system 824, an electrical system 826, a hydraulic system 828, and an environmental system 830. Any number of other systems may be included. Although an aerospace example is shown, the principles described herein may be applied to other industries, such as the automotive industry.

As already mentioned above, apparatus and methods embodied herein may be employed during any one or more of the stages of the production and service described in method 800. For example, components or subassemblies corresponding to component and subassembly manufacturing 808 may be fabricated or manufactured in a manner similar to components or subassemblies produced while the aircraft 802 is in service. Also, one or more apparatus embodiments, method embodiments, or a combination thereof may be utilized during the subassembly manufacturing 808 and system integration 810, for example, by substantially expediting assembly of or reducing the cost of an aircraft 802. Similarly, one or more of apparatus embodiments, method embodiments, or a combination thereof may be utilized while the aircraft 802 is in service, for example and without limitation during the maintenance and service 816. Thus, the innovative embodiments may be used in any stages discussed herein, or any combination thereof, such as specification and design 804, material procurement 806, component and subassembly manufacturing 808, system integration 810, certification and delivery 812, service 814, maintenance and service 816 and/or any suitable component of aircraft 802 (e.g., airframe 818, systems 820, interior 822, propulsion system 824, electrical system 826, hydraulic system 828, and/or environmental 830).

In one embodiment, a part comprises a portion of airframe 818, and is manufactured during component and subassembly manufacturing 808. The part may then be assembled into an aircraft in system integration 810, and then be utilized in service 814 until wear renders the part unusable. Then, in maintenance and service 816, the part may be discarded and replaced with a newly manufactured part. Inventive components and methods may be utilized throughout component and subassembly manufacturing 808 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a fuselage of an aircraft, the method comprising:
   disposing arcuate sections of fuselage at a track of a factory such that concavities of the arcuate sections of the fuselage face a floor of the factory, and bearing edges of the arcuate sections of fuselage directly contact the track;
   advancing the arcuate sections of fuselage synchronously along the track in a process direction;
   performing work within concavities of the arcuate sections of fuselage during pauses between pulses of the arcuate sections of fuselage via stations that are disposed beneath the concavities and that are directly mounted to the floor of the factory; and
   operating a Radio Frequency Identification (RFID) scanner to identify a flow of materials provided Just In Time (JIT) to the stations that performs the work on the arcuate sections.

2. The method of claim 1 wherein:
   advancing the arcuate sections of fuselage comprises pulsing the arcuate sections of fuselage.

3. The method of claim 1 further comprising:
   adjusting a vertical position of a station relative to a concavity of an arcuate section of fuselage.

4. The method of claim 1 further comprising:
   operating the Radio Frequency Identification (RFID) scanner that tracks a flow of materials into and out of an assembly zone bounded by the track.

5. The method of claim 1 further comprising:
   operating the Radio Frequency Identification (RFID) scanner that tracks a flow of personnel into and out of an assembly zone bounded by the track.

6. The method of claim 1 further comprising:
   operating the Radio Frequency Identification (RFID) scanner that tracks a flow of personnel into and out of a station.

7. The method of claim 1 further comprising:
   determining that a pulse of the arcuate sections of fuselage will occur within a threshold period of time; and
   delivering an auditory warning during the threshold period of time.

8. The method of claim 1 further comprising:
   sizing the stations to accommodate a particular type of work.

9. The method of claim 1 further comprising:
   sizing the stations to facilitate egress and ingress of personnel for the stations.

10. The method of claim 1 further comprising:
    sizing the stations to facilitate egress and ingress of materials for the stations.

11. A method for fabricating a portion of an aircraft, the method comprising:
    advancing a concavity of an arcuate section of fuselage in a process direction over a stationary station;
    performing work on the arcuate section of fuselage via the stationary station; and
    operating a Radio Frequency Identification (RFID) scanner to identify a flow of materials provided Just In Time (JIT) to the stationary station that performs the work on the arcuate section.

12. The method of claim 11 wherein:
    advancing the concavity results in exposure of new portions of an Inner Mold Line (IML) of the arcuate section of fuselage to the stationary station.

13. The method of claim 11 further comprising:
    pausing the arcuate section of fuselage.

14. The method of claim 13 wherein:
    performing work on the arcuate section of fuselage via the stationary station is performed during the pause.

15. The method of claim 11 wherein:
    the arcuate section is advanced synchronously with other arcuate sections of fuselage.

16. The method of claim 11 further comprising:
    scanning a Radio Frequency Identifier (RFID) chip embedded in a manufacturing excess of the arcuate section.

17. The method of claim 11 further comprising:
    operating the Radio Frequency Identification (RFID) scanner to track a flow of personnel into and out of a station.

18. A method for fabricating a fuselage of an aircraft, the method comprising:
    pulsing arcuate sections of fuselage, concavity oriented downward, synchronously along a track in a process direction; and
    identifying a flow of materials provided Just In Time (JIT) via a feeder line to an additive manufacturing station that performs work on the arcuate sections.

19. The method of claim 18 further comprising:
    disposing the arcuate sections of fuselage at the track such that bearing edges of the arcuate sections of fuselage directly contact the track.

20. The method of claim 18 wherein:
    identifying, via a Radio Frequency Identification (RFID) scanner, RFID chips coupled to materials that move relative to the additive manufacturing station.

21. The method of claim 18 wherein:
    identifying, via a Radio Frequency Identification (RFID) scanner, RFID chips coupled to personnel moving relative to the additive manufacturing station.

22. The method of claim 18 further comprising:
    controlling a rate of flow from the feeder line into the additive manufacturing station based on a feedback control of a takt time of the feeder line.

23. The method of claim 18 wherein:
    the additive manufacturing station comprises a work stand.

24. The method of claim 18 further comprising:
    passing the materials through a passageway into the additive manufacturing station.

25. The method of claim 18 further comprising:
    passing the materials under the track into the additive manufacturing station.

26. The method of claim 18 further comprising:
    passing personnel under the track into the additive manufacturing station.

27. The method of claim 18 further comprising:
    passing personnel through a gap between the arcuate sections of fuselage during pauses between pulses during the pulsing.

28. The method of claim 18 further comprising:
    determining personnel within the additive manufacturing station.

29. The method of claim 28 wherein:
determining the personnel comprises operating a Radio Frequency Identification (RFID) scanner by reading RFID chips worn by the personnel.

30. The method of claim 18 further comprising:
determining material within the additive manufacturing station.

* * * * *